Feb. 28, 1939.                R. L. NOWLAND                 2,148,493
                         MOTION PICTURE APPARATUS
                          Filed July 18, 1935           4 Sheets-Sheet 3
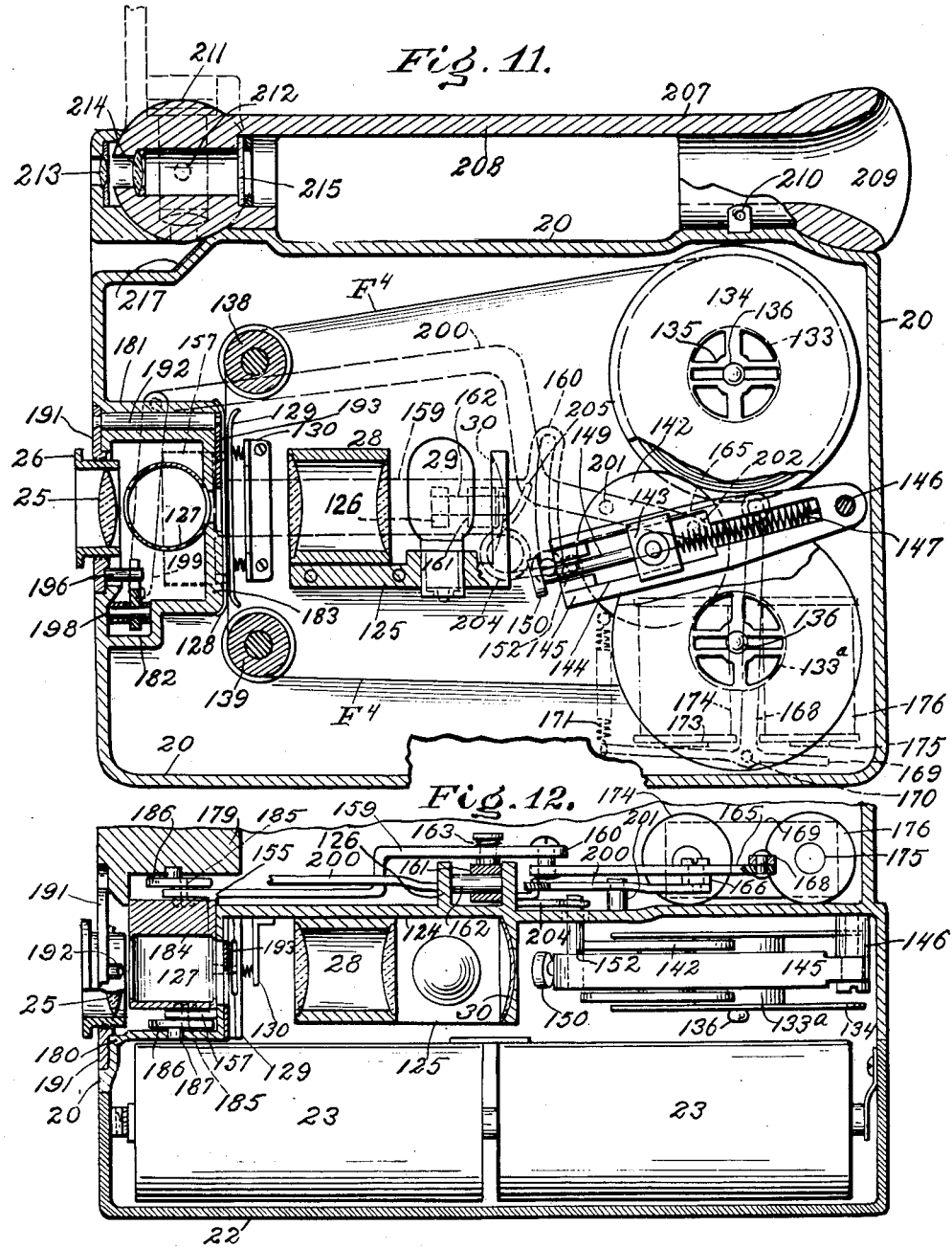
INVENTOR:
Roger L. Nowland
BY
Morrison Kennedy + Campbell
ATTORNEYS.

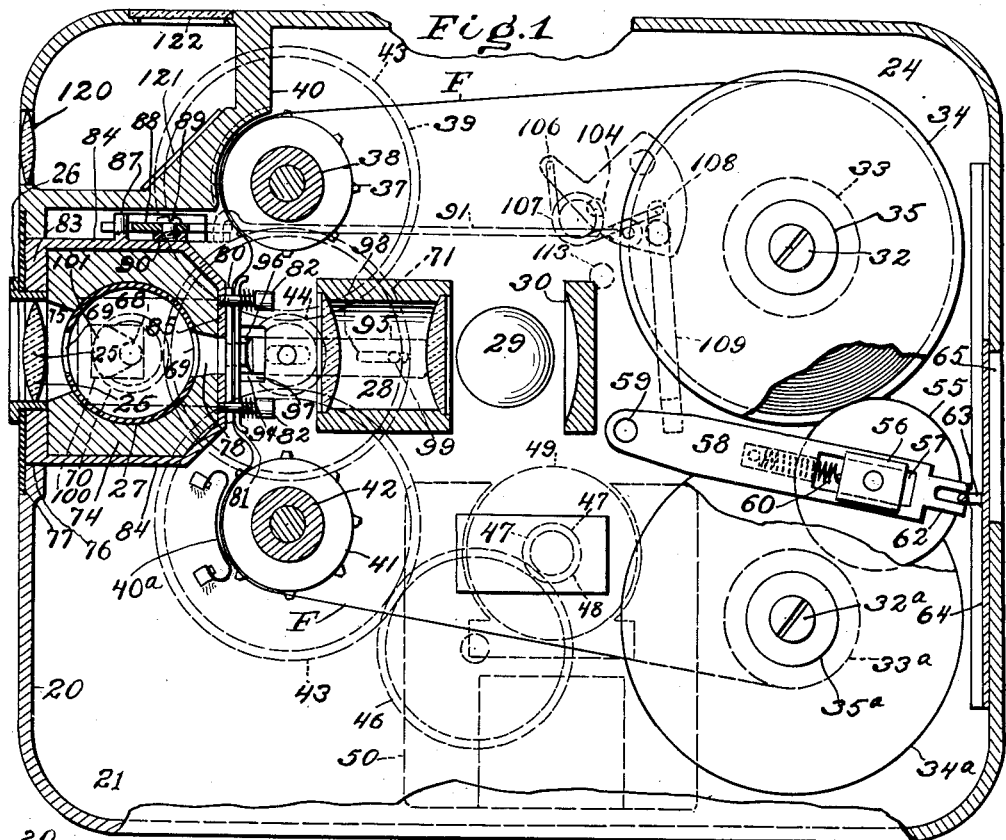
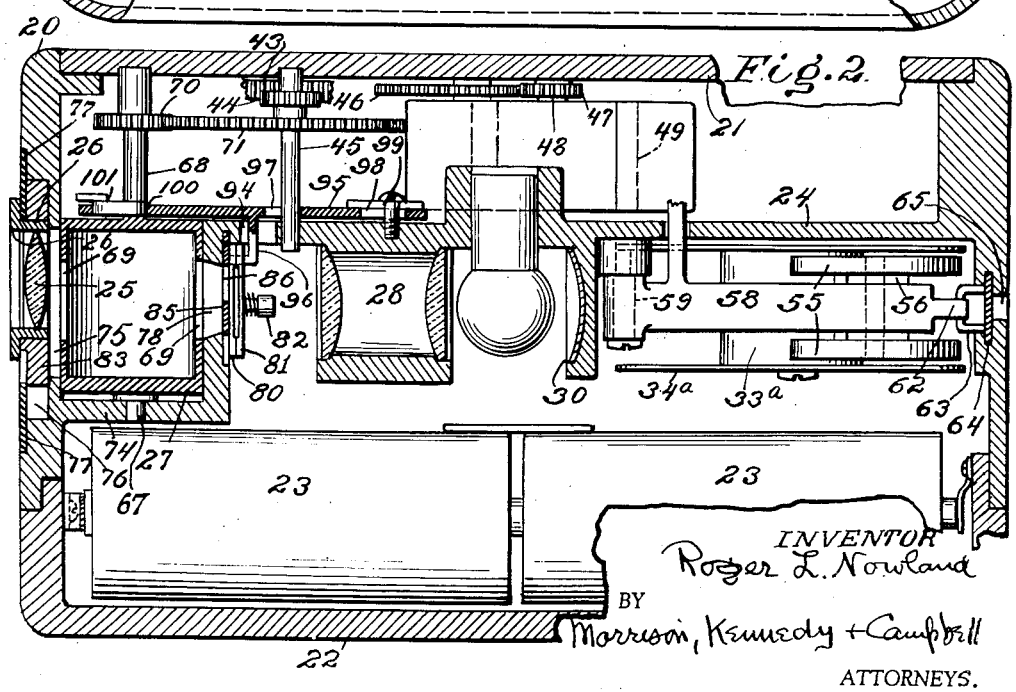

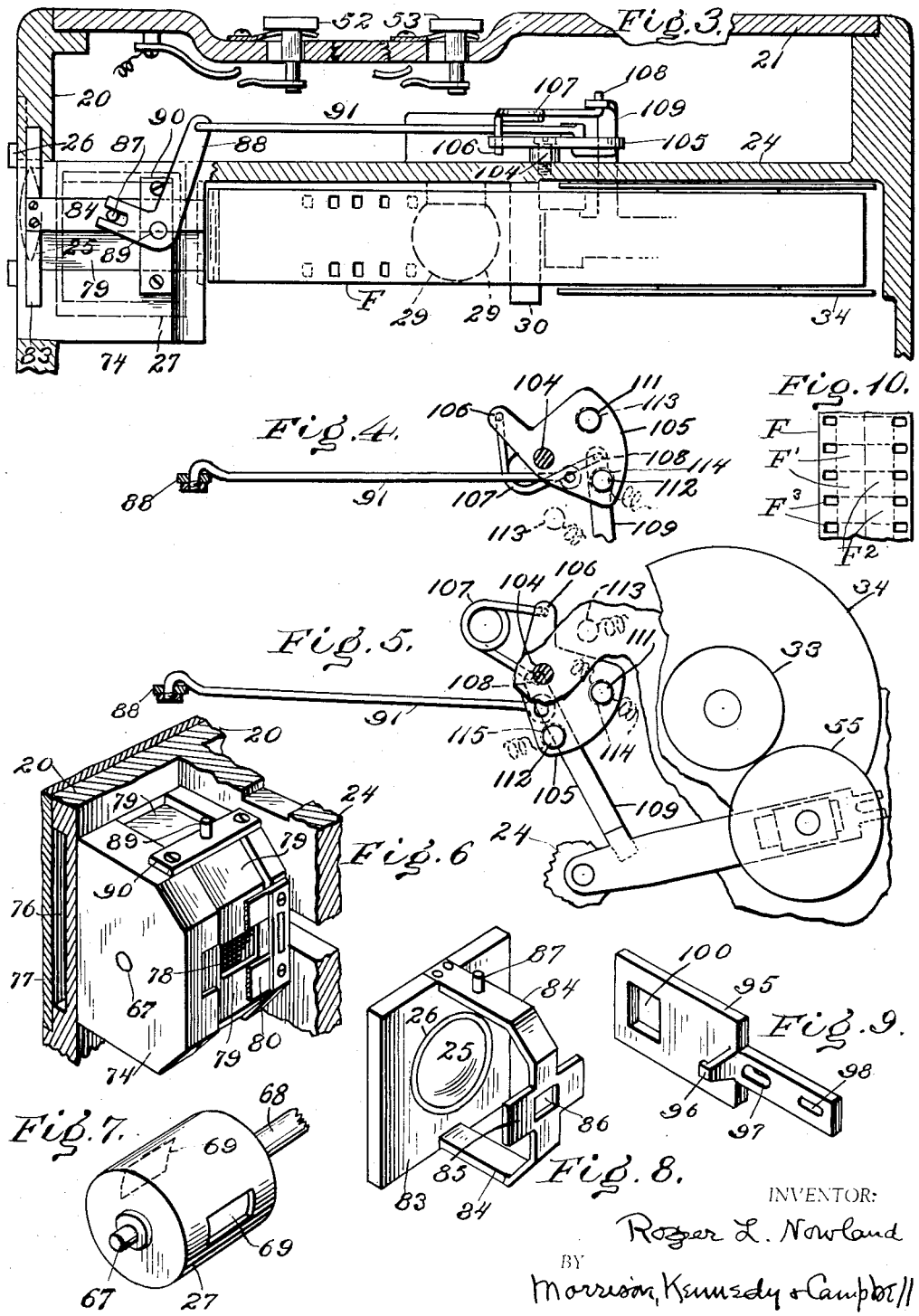

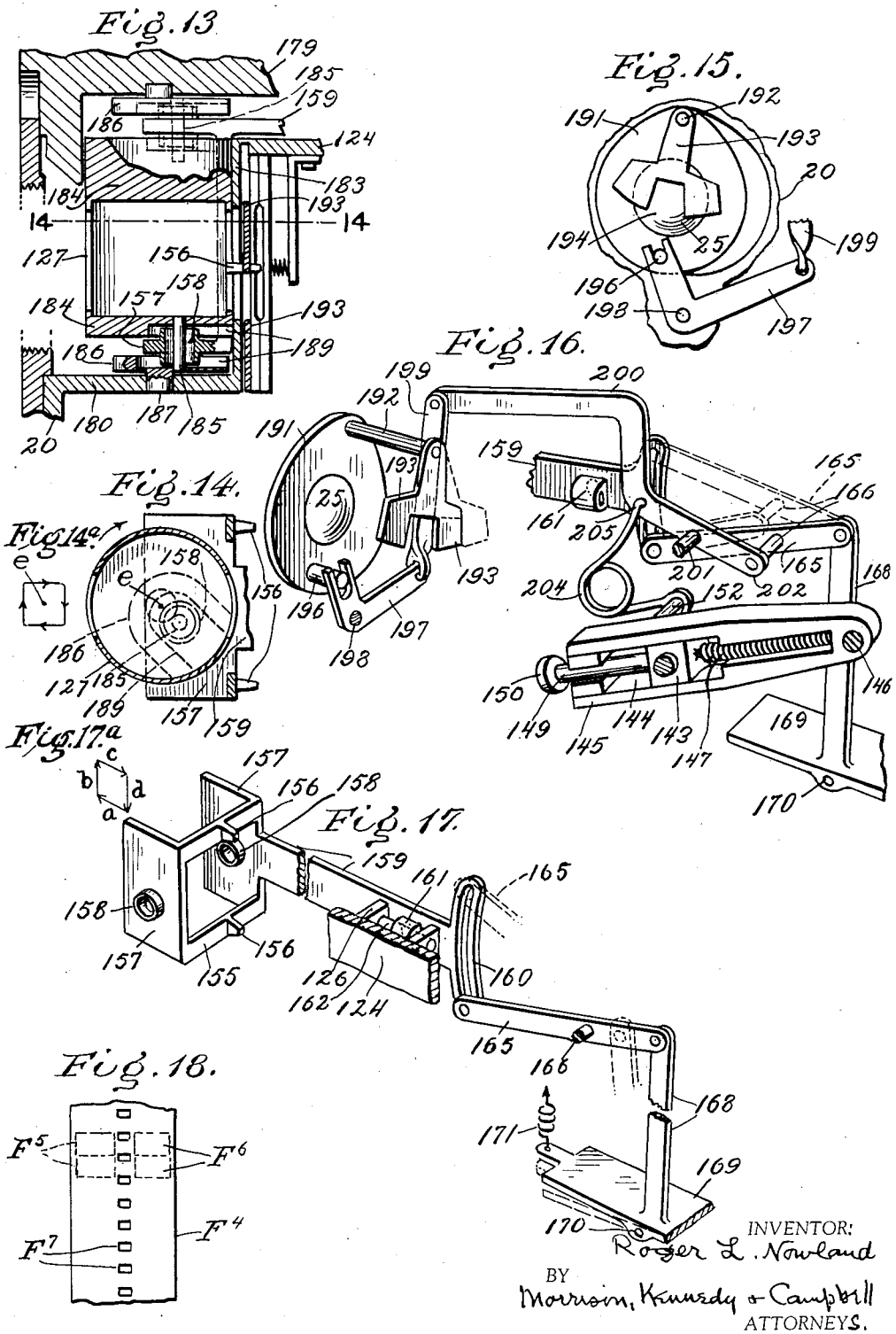

Patented Feb. 28, 1939

2,148,493

UNITED STATES PATENT OFFICE 2,148,493

MOTION PICTURE APPARATUS

Roger L. Nowland, New York, N. Y.

Application July 18, 1935, Serial No. 32,009

8 Claims. (Cl. 88—16)

This invention relates to motion picture apparatus, and more especially to such apparatus for amateur or home use. The features of novelty are applicable both to the camera and to the projector, and indeed, as will further appear, one of the features is the combining in a single apparatus of the means adapting it to be used either as a camera or a projector.

The general object of the present invention is to afford a motion picture apparatus of efficiency and accuracy of operation, yet simple and rugged in construction and of low manufacturing cost. A further object is to provide a single apparatus which may serve as a camera for the taking of exposures and may thereafter serve as a projector for exhibiting the motion pictures; thus avoiding the necessity of having separate apparatuses for these purposes. Other and particular features of improvement have reference to an improved drive mechanism for causing travel of the picture film; an improved take-up mechanism for the film that has passed the exposure point; a novel arrangement of film drive for a double-series film, whereby at the end of the film travel the direction of drive may be reversed, for exposure or projection during the rewind, thus avoiding the usual idle rewinding operation; also to a system automatic control of the forward drive of the film, its reversal for the return series, and the take-up thereof; also to a novel indicator exteriorly visible for showing the state of exhaustion or footage of travel of the film.

Other and further objects and advantages of the present invention will be explained in the hereafter following description of an illustrative embodiment thereof or will be understood by those conversant with the subject. To the attainment of such objects and advantages the present invention consists in the novel motion picture apparatus, camera or projector or both, and the novel features of combination, arrangement and construction as herein illustrated or described.

In the accompanying drawings Figure 1 is a left side elevation of an illustrative camera embodying this invention with the near wall omitted and certain parts shown in section taken on a vertical plane through the general center or light axis of the apparatus; it being understood that while in Fig. 1 the apparatus is considered as being set upright, it may in use be turned and used in any desired position. Fig. 2, looking from above, is a horizontal section taken substantially at the light axis, with the picture film omitted.

Fig. 3 is a partial top plan view with the top wall of the casing omitted, showing particularly the reversing devices for relatively shifting the lens between the advance and reverse travel of the film. Fig. 4 is a left side elevation of certain parts of the reversing devices, Figs. 3 and 4 showing these parts in the same initial or normal position as in Fig. 1. Fig. 5 is a left elevation similar to Fig. 4 showing the same parts in their subsequent or reversed position.

Fig. 6 is an interior perspective view showing the shutter housing and adjacent parts; while Fig. 7 shows in similar perspective the detached shutter, Fig. 8 the detached lens carriage, and Fig. 9 the film feeding member.

Fig. 10 is a face view of a perforated film adaptable to use with the apparatus of Figs. 1 to 9.

Fig. 11 in left elevation and section, similar to Fig. 1, shows a modified form of the invention. Fig. 12 is a horizontal section thereof taken substantially along the light axis.

Fig. 13 is a horizontal section showing the shutter, feed device and adjacent parts on a larger scale.

Fig. 14 is a vertical section of the shutter and feed device taken substantially on the line 14—14 of Fig. 13.

Fig. 14$^a$ is a motion diagram explanatory of Fig. 14.

Fig. 15 is an interior rear-elevation view of the shiftable lens and light shield arrangement.

Fig. 16 is a perspective view of the parts which cooperate in the reversals to be effected when the first series of images is exposed, including the lateral shifting of the lens and the light shield.

Fig. 17 is a similar perspective view of the connections for actuating the feed member.

Fig. 17$^a$ is a motion diagram explanatory of Fig. 17.

Fig. 18 is a face view of a form of picture film adapted to be used with the apparatus of Figs. 11 to 17.

In Fig. 10 is shown a form of picture film F adaptable to the apparatus of Figs. 1–9, this having a series of picture spaces F' for exposure or projection along one side of the center line of the strip, and at the other side thereof a similar series F$^2$, the two series adapted to be exposed or projected in sequence; and the film is shown with the usual marginal feeding perforations F$^3$. In the different form of film F$^4$ shown in Fig. 18, the respective series of picture spaces F$^5$ and F$^6$ may be somewhat larger than in the first form, since they extend more nearly to the edges of the strip, the single row of feeding perforations F⁷ being in the case located along the center line of the strip, a very advantageous arrangement for a reversibly operable apparatus. Notwithstanding that the apparatus of Figs. 1 to 9 is shown designed for a two-perforation-row film and that of Figs. 11 to 13 for a center-perforation-row film, the mechanical principles and actions of each apparatus are adaptable to use with either type or other types of film.

The embodiment illustrated in Figs. 1–9 comprises an outer casing or enclosure including a periphery wall 20, shown in Figs. 1–3, right wall 21 shown at the far side of Figs. 2 and 3 within which is located the drive chamber, and a left wall 22 shown in Fig. 2 within which is a recess adapted to hold a battery 23. Parallel to the right and left vertical walls is an intermediate vertical wall 24. Each of the walls is specially shaped or provided with fixed extensions as will hereinafter appear. The battery may consist of two or three pairs of dry cells, or other convenient number, connected for operation of the motor and lamp, for example in series, in parallel, or in multiple.

The general optical arrangements may be conveniently first described. At the front wall is the usual lens 25 carried in a ring or sleeve 26, which may be threaded for focusing, as usual, and carry a suitable lens stop or diaphragm. To the rear of the lens is a shutter 27 enclosed in a special housing 74 to be described, and being shown of a rotary type as appears in Figs 1, 2 and 7. Behind the shutter are gate and feed mechanisms as will be described. Behind these for projecting purposes is a condenser or lens system 28, and then an electric lamp 29, with a concave mirror 30 behind the lamp. The lamp 29 is of a modern type affording high luminosity without undue heat, and it may be energized from the battery 23 when the apparatus is used as a projector, the lamp, condenser and mirror being inoperative at other times.

Referring next to the disposition and travel of the film F, an upper spindle or stud 32 is shown mounted at the left side of the wall 24, with a film supply reel or spool 33 turning loosely thereon, having the usual side flanges 34 protecting the film. A disk or washer 35 is shown holding the spool in place on its stud. Below these parts is a lower axle or spindle 32ᵃ carrying a lower reel 33ᵃ with flange 34ᵃ and holding disk 35ᵃ, this reel serving initially for taking up the film supplied by the upper reel, the operation being subsequently reversed for rewinding purposes. The upper or supply reel may be rendered readily exchangeable, as will be described, while the lower or receiving reel may be permanently fitted or secured upon its spindle, not requiring interchange.

For driving the film F it is shown passing from the supply reel 33 to and partly around an upper sprocket wheel 37 having pins registering with the film perforations. The sprocket wheel is fast on a shaft 38 carrying, beyond the wall 24, a gear 39. A similar lower sprocket wheel 41 is mounted on a shaft 42 carrying a gear 43. The gears 39 and 43 are geared together by an idler gear 44 on shaft 45, so that the two sprocket wheels turn together in unison in the same direction, thus driving the film to and from the intermittent feed mechanism to be described, preferably with a loose loop of film between each sprocket and the feed, as shown in Fig. 1. A fixed guard or guide 40 is shown for holding the film in engagement upon sprocket 37 and a shiftable guard 40ᵃ for the sprocket 41.

The drive may be manual, by a crank or other means, but is preferably performed by power, for example electric, with connections as follows. An idler gear 46 extends between the gear 43 and a pinion 47 on the shaft 48 of the armature 49 of a small electric motor 50 adapted to be energized by direct current from the battery 23. The motor is preferably of the kind which reverses with the current, dispensing with a mechanical reverser; and which operates at a predetermined fixed speed, dispensing with a governor.

Appropriate electric circuits are to be understood and need not be shown in detail. A switch or button 52 is shown, which may be of flash-lamp type, serving to connect the battery with the motor so as to operate the drive either for a short or an extended series of exposures. In the same circuit may be an automatic reverser 111—115 as will be described. A second button or switch 53 is indicated, the circuits from which may connect the battery to the lamp to illuminate it for projection purposes. The amount of current required both for the lamp and the motor is very small and the described battery of usual type will serve all ordinary amateur purposes.

Describing next the operation of the film reels 33 and 33ᵃ, and the take-up drive, it will be understood that one or the other of the reels, for example 33 initially, will be rotated by the pull of the film therefrom. As the upper reel gives up film the lower reel should proportionately take up film. This is herein accomplished by the direct means of a bridging takeup drive, in the form of a rolling device 55 extending across and engaging the outermost convolutions of the film portions remaining reeled on the respective reels at any given time. While a compound device or roller might be used with some multiplication of movement to overcome slippage, there is shown a simple roller 55 composed of two disks, one bearing on one margin of each of the films and the other part bearing on their opposite margin, thus in effect gearing together the films. Being located at the perforated margins of the film of Fig. 10 the driving grip is good and is without injury to the sensitive portions thereof; and the roller peripheries may be surfaced to improve the action. The two roller portions or disks are connected by a short shaft which extends through a flanged block 56 movable radially in a slideway 57 mounted at the extremity of a shiftable or swingable carrier or arm 58 fulcrumed at 59 upon the wall 24. A spring 60 is mounted to pull the block toward the fulcrum, thus forcing the takeup transmitter or roller into resiliently pressing contact with both films. The lineal speed at which the upper reel pays out film is thus transmitted through the roller to cause the same lineal speed of film takeup by the lower reel. The carrying arm yields or swings laterally as required by the varying changes of diameter of the wound film contained on the respective reels. Manifestly the carrier and roller will shift toward the axis of the upper reel as the film is being taken up on the lower spool, and vice versa, as seen by comparing Figs. 1 and 5.

This movement of the take-up transmitting roll is herein utilized to operate a visible indicator showing the footage of travel and extent of exhaustion of the film. Thus the arm 58 is shown as having an extension 62 engaging a projection 63 on a sliding scale 64. The extension 62 is in the nature of a fork and the projection 63 a pin, so that the scale is slid vertically in accordance with the amount of film on the respective spools, the scale passing behind a rear wall window 65 having a cooperating index mark, although the scale and index might be reversed.

The shutter mechanism and lens mountings will next be described. The shutter 27 may be of the rotary type and is shown separately in Fig. 8. It has an axle stud 67 at one end and a shaft 68 at the other. It is a hollow cylinder and has opposite shutter apertures 69 which afford exposure when in line with the lens on the optical axis. As seen in Figs. 1 and 2 the shutter shaft carries a gear 70 which is driven by a gear 71 on the shaft 45 which carries the idler gear 44. These and the other gears described are so proportioned that the shutter turns in synchronism with the film drive, causing one exposure for each intermittent film advance.

The rotary shutter 27 is fitted within a housing 74 in the walls of which its stud and shaft turn. Said housing is at the inner side of the front wall, and said wall, immediately in front of the shutter, has an aperture 75 through which light may pass to and from the lens 25. The front wall also is formed with a recess or way 76 in which a plate 83 to be described may slide laterally to the light axis. In front of these is a fixed plate 77 closing the way and confining the slideplate. The housing has also an aperture or window 78 in its rear wall, to the rear of the shutter. Around its exterior the housing 74 has a series of shallow recesses 79 to accommodate the shiftable parts 84 and 85 to be described. Attached at the rear side of the housing is a fixed gate 80, partly omitted in Fig. 6, apertured behind the window 78, and its aperture laterally elongated to accommodate the part 85. The vertical margins of gate 80 are contacted by the edges of the traveling film, and the remainder of the gate is slightly recessed at the rear side as shown in Fig. 6 to protect the center of the film from contact. To the rear of the fixed gate 80 is the movable or retractible gate 81, complementarily recessed, and having opposite spring devices 82 holding it resiliently to the fixed gate and permitting travel of the film between the two.

The lens 25 and its sleeve 26 are shown mounted on a shiftable member or slideplate 83, movable in the slideway 76, and by which the lens may be bodily shifted laterally so as to center it first opposite the first side or half of the film and subsequently at the second side. In Fig. 2 the slideplate and lens are shown in their right hand position, the slideway being of sufficient extent to permit bodily shift to a complementary left hand position.

In order to confine the film exposure to the proper side of the film, in each adjustment of the lens, the following arrangement is shown. The lens plate is shown as connected by top and bottom bars 84 with a rear bar 85, these combined parts constituting a carriage shown separately in Fig. 9. These bars slide right and left in the housing recesses 79 when the lens is shifted. The center part of the bar 85 is enlarged as a light shield, accommodated in an enlarged part of the rear recess in front of the window of gate 80; and this shield contains an aperture or window 86 of the same small lateral dimension as the image spaces of the film. The shiftable aperture 86 defines the dimension of the image, and may be described as of half width, but shiftable from side to side; while the other described apertures 75, 69, 69 and 78, and those in the gates 80 and 81 are all of at least double the width of aperture 86, so that as the lens and carriage with aperture 86 shift they determine at which half of the film the exposure or projection will be effected.

The lens slideplate 83 and the bars 84 and 85 thus constitute a carriage shiftable laterally to adjust this part of the optical system between its right and left positions. Such adjustment might be effected manually after one side of a film has been exposed for the purpose of return travel of the film. For performing this adjustment mechanically the following connections are shown. Outstanding from the carriage 83—85, for example upstanding from the top bar 84, is a pin 87, and this as shown in Figs. 1 and 3 is engaged by the slotted arm of a bell crank lever 88 pivoted by a pin 89 upon a cross bar 90 fixed on top of the housing 74. By a link 91 and other connections yet to be described the lever 88 may be thrown and the lens and carriage shifted at the proper time.

Referring next to the intermittent feed device for the film, this may take various forms, but is shown as advantageously comprising a feed member 95 having an engager or claw extension 96 adapted to enter the film perforations for feeding purposes, and to be motor actuated in time with the film drive mechanism 37 to 48 already described. The feed member 95 is illustratively shown in the form of a bar having the claw extending as a lateral or leftward projection, as separately shown in Fig. 9. The bar is arranged to be put through movements of advancing feed, disengagement from film, return, and reengagement with film, on generally well known principles. As seen in Figs. 1 and 2 the feed member is arranged to slide against the right side of the interior wall 24, where it may be suitably confined while adapted for fore-and-aft and up-and-down motions to allow the described feeding action. The wall 24 has a hole 94 through which the claw freely extends. The feed member is formed with a hole 97 for accommodation of the shaft 45, which happens to be at this point. One of its ends, for example its rear end, is shown as mounted on a sliding pivot, consisting of a slot 98 in the feed member engaging upon a fixed pin 99 mounted at the right hand side of the wall. At its other end the feed member is formed with a cam recess or hole 100 engageable by a cam 101 turned by the drive mechanism. For example the cam may be mounted on the same shaft 68 that carries the shutter. The relation of the cam with the recess may be as indicated in Fig. 1, so that with each rotation of the shaft and shutter the feed member passes through its four motions as described. The film is thus fed step by step past the light path, one unit or picture space at each action, while the drive mechanism including sprockets 37 and 41 advances the film steadily at the same net rate of travel, with the usual loops of film between the respective sprockets and the feed member and gates.

For the lateral shift of the lens after a given film has been exposed along one side of its center line, the lever 88 and link 91 have been described. The link may be operated to shift the lever and lens by the following self acting connections. Referring to Figs. 1, 3, 4 and 5 there is shown a reversing member or sector 105, and the link 91 is pivoted to a middle part of the member in such position that when the member is thrown from the initial position shown in Figs. 1, 3 and 4 to the shifted position shown in Fig. 5 the link will be thrown frontward and thus swing the lever 88 and cause the desired lateral shift of the lens. The reversing sector is pivoted at 104 upon the right side of the wall 24. It is operated through a spring piece or snap device 107 pivoted at 106 upon the sector and pivoted at 108 upon an actuating arm 109. The spring may be of coiled wire with outstanding ends adapted to press apart the pivots and afford a snap reversal of position as will be described. The arm 109 may conveniently be operated from the movable carrier 58 of the take-up device, being shown in fact as a rigid extension thereof.

The spring snap action of reversal may be as follows. Initially the actuator arm 109 is in position shown in Figs. 1, 3 and 4, with the spring pivots 106 and 108 in such relation that the line joining them is to the right of the pivot axis 104 of the sector 105. The spring compression and spreading thrust therefore tends to turn the sector counter-clockwise, thus holding the parts in the position shown, a stop being afforded by the contact of the bar 84 against part of the housing 74. This is the initial condition when the upper reel 33 is full and the lower reel 33ᵃ is empty. As the film travels from the upper to the lower reel the take-up carrier 58 swings progressively upward and the arm 109 gradually leftward, increasing the strain of the spring but continuing the tendency to hold the parts in place. This action continues until just before the exhaustion of the upper spool. The parts are so designed and adjusted that at or near the point of exhaustion the arm 109 has swung frontward, carrying with it the spring pivot 108, to the point where the line connecting the spring pivots shifts to the other side of the axis 104 of the sector, whereupon the spring acts with a snap movement to throw the sector from the position of Fig. 4 to that of Fig. 5, thus shifting the lens quickly across leftward for the return film movement. The opposite action takes place about the time the film has been completely rewound upon the upper reel, the lens being then snapped back to its initial or right hand position.

Preferably the same control by which the lens is laterally shifted prior to rewind of film is utilized also to cause the necessary reverse of film travel. This is illustratively effected by the reversing of the drive motor 50, specially wound and arranged for this purpose. To reverse the current to the motor a reversing switch or contact arrangement of any sort may be employed, such as that indicated in Figs. 1, 4 and 5, wherein the sector 105 carries a pair of contacts 111 and 112 insulated from each other, and there are three fixed contacts 113, 114, and 115 in operative relation thereto. For example the contacts 111 and 112 may be connected by a circuit not shown to the terminals of the motor, while the fixed contacts 113 and 115 may be connected with each other and to the positive end of the battery, and the fixed contact 114 to the negative end of the battery. Thereby the sudden throwing of the sector 105 from the initial position of Fig. 4 to the reverse position of Fig. 5 causes a reversal of current and therefore a reversal of drive and film movement.

The various operations and functions of the apparatus are thereby coordinated. The film being supplied from one of the reels to the feed mechanism operates the take-up device to rotate the other reel. These actions are thus indirectly performed by the power of the drive mechanism advancing the film through the exposure point. The film is advanced preferably steadily except as to the step feed while traversing the film gate behind the lens and shutter. In each cycle of action a unit of film length is advanced, and during the same cycle the shutter is operated. From the same drive connections, at the end of the exposure or projection of one side of the film, when the initial reel is exhausted and the receiving reel is full, the lens is shifted across into line with the opposite side of the film, and at the same time the drive is reversed, and the operation continued until the second side of the film has been completely exposed or projected.

Various known attachments and adjuncts will be understood. For example, a finder is shown at the front corner of the apparatus comprising a lens 120, a diagonal mirror 121 and a ground glass 122 upon which the image may be viewed; but I prefer a finder of a special kind as will be hereinbelow described.

The invention thus far described may be outlined as follows. It uses strip film wound upon supply and receiving supports or reels. The optical system comprises the shutter 27, the lens 25 and the plate or shield 85 adjacent to the film, initially positioned for exposing a half or part-width of the film, which may be termed a first zone, while shielding the remainder or other zone thereof, namely during the first or advancing period of film travel, during which period the drive actuates the shutter and advances the film from the supply to the receiving reel. The drive mechanism is reversible so that during a second period it may cause the return travel of the film to the supply reel. The optical system is adjustable so as to permit relative shifting, preferably both the lens and the shield, between the two travel periods, and to a position for exposing the second part-width zone of the film while shielding the remainder during the second travel period. The motor 50 is adapted to operate the mechanism in either direction. The invention discloses a single means, the connections operated from the arm 109, for causing reversal of the drive and the shifting of the carriage which carries the shield 85 and preferably the lens 25, such means being shown as operated by a follower engaging upon one or both of the wound films. Within the camera casing 20, 21, 22 is enclosed, behind the film, a projecting system comprising electric lamp and condenser; a battery energizing the lamp, and the motor 50 also being battery operated. The special take-up device 55–60 is operated by the film wound on the supply reel and it causes take up by operation upon the film wound on the receiving reel, this take-up drive shown as comprising an idler transmitter or rolling means which contacts both films upon both reels and in effect gears them to each other, so that the drawing of film from one reel causes take up at the other.

Coming now to the embodiment of Figs. 11 to 18, some of the elements correspond closely with Figs. 1 to 10. The camera casing comprises the peripheral wall 20, the right wall 21 and the left wall 22 accommodating the battery 23. The lens 25 is mounted in its sleeve or ring 26 and is laterally shiftable as will be further described. The shutter 127 is of the rotary type but different in construction and operation. Along the light axis are the condensing lens combination 28, and the projecting lamp 29 with mirror 30 behind it. The substantially vertical partition wall 124 corresponds with the wall 24 already described, and at its left side carries a shelf 125 on which are supported the condenser, the lamp and the mirror. The wall also has rightward extending lugs 126 giving support to part of the connections for driving the shutter and feed device. The film $F^4$ travels through the exposure point between the front or fixed gate 128 and the movable rear gate 129 pressed forwardly by a spring device 130.

In this embodiment the film $F^4$ as particularly shown in Fig. 18 is formed with a first series of picture spaces $F^5$ along one side of the center line of the strip and at the other side of a second series of picture spaces $F^6$, the two series adapted to be exposed or projected in sequence; and the film is shown with a single central series of feeding perforations $F^7$ cooperating with the feed means to be described. The film $F^4$ is shown as supplied by an upper reel 133 which will be termed the supply reel, and it is taken up by a lower or receiving reel 133$^a$. Each of the reels has the usual side flange 134 and one side flange, composed of thin springy metal, is shown cut out at 135 to afford a resilient yielding action by which the reel may be snapped on to and removed from a headed stud 136.

In this embodiment the continuous drive of the film by sprockets is obviated, and the entire film movements are step by step in accordance with the intermittent feed past the exposure point. Accordingly the film $F^4$ is shown as passing from the supply reel 133 around an upper guide roll 138, thence through the gate 128, 129, and thence around a lower guide roll 139, and thence to the receiving reel; the rolls 138 and 139 being idlers of light weight.

The driving or following roller 142 for driving the receiving reel by the film thereon from the film on the supply reel operates on the principles already described. It is shown as comprising two thin roller parts engaging the extreme margins of the traveling film, but may equally well consist of a single driving or transmitting roll operating centrally, and therefore running upon the central perforations $F^7$, perhaps with surface construction for engaging such perforations. The transmitting roll is shown mounted on a block 143 slidable along a slideway 144 contained in a swinging arm or carrier 145, fulcrumed in this case at 146 near the peripheral wall 20. The arm carries a spring 147 pulling the block rearward and therefore maintaining the roll 142 in resilient but gripping contact with the films upon both of the reels. To facilitate the retraction of the roll and the exchange of reels the block 143 is shown as provided with a stem 149 sliding through the front end of the arm and exteriorly provided with a head or button 150 in the nature of a handle for pulling against the spring 147 to retract the roll. The arm or carrier 145 has also a rightward extending stud 152 for operating a reversing device as will be later described.

The feed member 155, shown separately in Figs. 14 and 17 is shown in this case with upper and lower claws 156, centrally located, so as to engage two of the perforations of the film $F^4$. The feed member operates in front of the film as seen in Figs. 12 and 13 and the claws therefore project rearwardly, and the feed member has two forwardly extending vertical flanges 157 enclosing the rear portion of the rotary shutter 127. Each of the vertical flanges 157 carries a sleeve or hollow boss 158 which projects both rightwardly and leftwardly from the flange and takes part in the shutter operation as will be later described. The feed member also has a long rearwardly extending shank 159, which may have an offset bend as shown in Fig. 12 to clear certain parts, and the extreme rear end of the shank has curved slotted head 160 by which it is actuated either from the bottom or from the top end of the slot. The shank 159 has at its left side a swivel block or lug 161 adapted to slide loosely fore-and-aft upon a fixed bar 162 mounted in the wall lugs 126. In contrast to the free sliding of the swivel block 161 upon the bar 162 it is intended to permit rotation of the shank only with stiff resistance, and Fig. 12 shows a friction device 163 applied to the block pivot for this purpose. The actuation of these parts is through a link 165 extending rearwardly and having at its left side a stud 166 by which the link position may be reversed to the dotted position shown in Figs. 16 and 17; the link being actuated by a frontwardly and rearwardly reciprocating member 168 shown in the form of an upright arm or rocker mounted on a base 169 pivoted at 170 and held lightly in the position shown by a spring 171. The dotted position of arm 168 shows approximately the extent of swing of the arm, and has no relation to the dotted reversed position of link 165.

The motions delivered to the feed member may be as follows, with reference to the path diagram $a$, $b$, $c$ and $d$ applied adjacent to one corner of the feed member. When the rocker 168 swings frontwardly it first operates through the link 165 to thrust the shank and feed member frontwardly, represented by the diagram arrow $a$. This motion disengages the feed claws from the film perforations. When however the swivel block 161 reaches the end of its frontward movement, and meets the front wall lug 126, the frontward shift ceases. The continued frontward movement of the rocker then operates through the link to swing the shank 159. The front end of the link has its pivot in the lower end of the slotted head 160, so that the thrust of the link swings down the head and swings up the feed member, which thereby retracts upwardly to the extent of the length of a single image on the film, represented by the diagram arrow $b$. Theoretically the frontward movement is completed before the rising retraction commences but in practise these movements will somewhat merge, rounding the corners of the diagram. With the rear retraction of the rocker 168 substantially the reverse actions take place, but in the reverse order. The stiffness of the swivel pivot prevents the downswing of the feed member until after the rearward shift. Thus the block slides on the bar for the rearward shift $c$, and at the end of this movement the pull of the link on the head swings the shank and the feed member returns at $d$ to initial position; the movement $c$ engaging the claws with the perforations and the movement $d$ feeding down the film by the length of one image.

Instead of a rotary motor, in the present embodiment an oscillating motor is employed, with parts rocking as does the clapper of an electric bell. The rocking base or plate 169 already referred to is shown utilized as the armature of an oscillating motor. This armature is pivoted at 170 and is held lightly in one extreme position by the spring 171. The driving motor of this embodiment comprises these parts together with a pair of magnets comprising a front magnet core 173 surrounded by coil 174 and rear core 175 surrounded by coil 176, the magnets standing respectively immediately over the front and rear ends of the rocking armature 169 as shown in Figs. 11 and 12. The circuits from the energizing battery 23 will be understood to be of usual character, and are not illustrated. The action is that when the starting button is shifted and the circuits closed the rear magnet is first energized, lifting the rear end of the armature and throwing forwardly the rock arm 168. The termination of this motion is accompanied by the automatic reversal of the circuits so that the rear magnet becomes deenergized and the front magnet energized, which lifts the front end of the armature and throws rearwardly the rocker 168. The spring 171 is too light to interfere with this driving motion, but insures that the circuit will be initially closed for energizing the rear magnet at the starting of an operation. The circuits are then reversed again. The action is readily regulable to afford, say, 16 cycles per second, more or less.

This vibratory motor operates to drive the feed device and the shutter, and connections may be provided for it to drive also the take-up roll 142 and thus the two reels, in coordination.

The shutter 127 is shown as enclosed within a fixed housing having right and left walls 179 and 180 and top and bottom walls 181 and 182 with a rear wall 183 extending between the left wall and the partition wall 124. The shutter itself as seen in Figs. 11 to 14 is of the same rotary type as in Figs. 1, 2 and 7, one of its end walls 184 being shown solid and fairly heavy to afford a fly wheel effect. The shutter, instead of being mounted by simple shafts or studs has a particular construction whereby its rotation may be effected from the four-motion travel of the hollow bosses 158 of the feed member 155. Thus at each end the shutter has an offset pin 185 in the nature of a crank pin, this being rigidly attached to the shutter end wall 184 and to a web-plate 186 spaced outwardly therefrom, these web-plates carrying central pivot studs 187 turning in the housing walls 179 and 180; these combined elements 184 to 187 being unitarily interconnected as a rigid whole. The hollow bosses 158 of the feed member surround the crank pin 185, but with a substantial clearance, as the two do not cooperate. Each of the bosses however, at each side of its flange 157 extends into operative engagement with a radial recess 189 in the shutter end wall 184 or the web-plate 186. There are thus four of the radial recesses 189 and four points of engagement between the feed member bosses and the shutter. The parts are so relatively arranged, as shown in Fig. 14, that as the feed member traverses its four-motion circuit, the bosses travel the same path around the axis e of the shutter, as shown in Fig. 14 and in the small motion diagram adjacent thereto. The motion of the bosses around the shutter axis, acting upon the sides of the radial recesses 189, causes the rotation of the shutter. The substantially square path of the bosses thus delivers a rotary motion, the bosses sliding radially in the recesses as may be necessary. Each complete feed device operation therefor, and each feed of the film, is accompanied by a complete rotation of the shutter, with consequent exposure, the parts being so timed that the shutter windows are only in alinement while the film is not being fed.

When a film has been exposed along the series of spaces at one side the apparatus is to be reversed in action, the drive of film being reversed, and the lens and shield plate shifted across to the other side of the film, analogous to the action explained in connection with the first embodiment. In Figs. 11, 12, 15 and 16 the lens 25 is shown as shiftable across by a swinging rather than a sliding motion. The lens is carried on a swingable plate 191 mounted at the front end of a pivot shaft 192 turning in the housing wall 181, the plate being fitted at the front of the housing with the lens in front of the shutter. The shaft 192 carries not only the lens plate 191 but a shield plate 193 having two shielding portions with a window 194 between them for exposure of one or the other side of the film. These elements 191–194 constitute a carriage shiftable laterally for the purposes described.

For shifting the lens and shield carriage there is shown at the rear side of the lens plate a projecting stud 196 engaged by the upper arm of a bell crank lever 197 pivoted at 198 to the front housing wall. The right arm of the bell crank is connected by a depending vertical link 199 with a lever 200 which may be termed a reversing lever, this having a fixed fulcrum or pivot 201 on the partition wall 124, and the lever having an extension 202, the extremity of which is pivoted to the stud or pin 166 outstanding from the link 165 of the feed member actuating connections, as best shown in Fig. 16. When the reversing lever 200 is swung from the full line position shown to its reversed or dotted line position, partially indicated, this effects both a shifting of the lens and shield plate and a reversal of the feed connections, the latter by lifting the link 165 to the dotted line position of Fig. 17 wherein the motions as shown in the diagram will be reversed, causing feed upwardly rather than downwardly of the film.

The reversal of these parts may be effected by a snap action analogous to that previously described, controlled by the swinging of the carrier 145 which carries the drive roller 142 that bears upon the wound film on the respective reels. As the film on the supply reel becomes exhausted the carrier arm 145 swings progressively upward. The extension or stud 152 thereon rises gradually and is so positioned that its axis comes into coincidence with the axis of the pivot 201 about which the reversing lever swings, and slightly therebeyond. The reversal is effected by a snap spring 204 having one terminal on the stud 152 and the other terminal pivoted at 205 on the lever 200. Normally the spring acts to hold the parts in their full line position as shown, but when the rising stud 152 reaches and passes the pivot 201 the terminals of the spring, pressing apart, throw abruptly the reversing lever 200 completely down to its reversed position. As already explained this snap action shifts laterally the lens and shield plate for the exposure of the opposite side of the film, and at the same time lifts the link 165 to cause reversal of the feed motion, so that the film will feed upwardly and travel back from the receiving to the supply reel.

A convenient combined handle and finder 207 for the described camera is shown in Fig. 11, wherein the bar 208 constitutes the handle, with a finger space open between it and the peripheral casing wall 20 below. At the rear end is the eye piece 209 and a catch 210 to hold this end firmly to the rear part of the casing. In order that the finder can be used either for horizontal or vertical vision the front end is formed as a cylindrical head 211 turning in a fixed front extension of the casing, with pivot pins 212 connecting the head to side portions of the casing. The head 211 has a longitudinal bore through it, as has also the eye piece, giving through vision. At the front of the camera is a fixed finder lens 213 behind a suitable front opening. In line with the lens 213 is a lens 214 carried on the swingable head 211, and behind these lenses and in line with them is a ground glass plate 215 receiving the image to be viewed through the eye piece. For vertical viewing the catch 210 is released and the device swung vertically to the dotted line position partially shown. In this position the lens 213 is inoperative but a diagonal mirror 217 mounted on the casing wall then cooperates with the lens 214 and ground glass 215 to afford a suitable view of the field.

There has thus been described a motion picture apparatus which embodies the principles and attains the advantages of the present invention. Since many matters of combination, arrangement and construction may be variously modified without departing from the principles of the invention it is not intended to limit the same to such matters except to the extent set forth in the appended claims.

I claim:

1. Motion picture apparatus using wound strip film and having film supply and receiving reels, an optical system comprising a shutter and a lens, and a plate-like shield adjacent the film positioned for exposing a part-width first zone of the film while shielding the remainder thereof during a first period of film travel, drive mechanism for actuating the shutter and for advancing the film from supply to receiving reel during such first travel period, said mechanism being reversible in action for thereafter during a second period causing shutter actuation and return travel of film to the supply reel, said shield being adjustable to permit relative transverse shifting between travel periods to a position for exposing a second part-width zone of the film while shielding the remainder thereof during the second travel period, a rolling follower constantly engaging the film on both of the reels for causing take-up of film on one reel, and connections actuated by said follower for causing both the reversal of the drive and the transverse shifting of the shield.

2. Motion picture apparatus using wound strip film and having film supply and receiving reels, an optical system comprising a shutter and a lens, and a plate-like shield adjacent the film position adapted in a first position to expose a part-width first zone of the film while shielding the remainder thereof during a first period of film travel, drive mechanism for actuating the shutter and for advancing the film from supply to receiving reel during such first travel period, said drive mechanism being reversible in action for thereafter during a second period causing shutter actuation and return travel of film to the supply reel, said shield being shiftable from its first position between travel periods to a second position to expose a second part-width zone of the film while shielding the remainder thereof during the second travel period, a rolling follower constantly engaging the film on both of the reels for causing take-up of film on one reel, and connections actuated by said follower for causing both the reversal of the drive mechanism and the shifting of the shield.

3. Motion picture apparatus using wound strip film and having supply and receiving reels for the film, rotatable upon fixed-position axes, an optical system comprising a shutter and lens, and drive mechanism for actuating the shutter and for advancing the film, from the supply reel through the exposure point, and characterized by a take-up drive device by which the film wound on the supply reel may cause take-up operation upon the receiving reel, consisting of an idler rolling means contacting the films upon both reels and in effect gearing them to each other whereby the drawing of film from the first reel effects corresponding take-up on the other, said rolling means being offset substantially from the common plane of the axes of the two reels and fitted for bodily floating movements including movement toward and from such plane, and having spring or resilient means constantly pressing it toward such plane whereby to maintain it in driving contact upon both wound films, as the film travels from one reel to the other.

4. Apparatus as in claim 3 and wherein the two reels turn always both in the same direction and the rolling means consists of a single roller arranged for bearing on the film on both reels.

5. In combination with an apparatus as in claim 3, a film consumption indicator comprising a sliding scale or index at a casing wall, and interior means actuated by the shifting of said rolling means during its contact with the film on both reels, for sliding the scale or index in accordance with the travel of film from one reel to another.

6. Motion picture apparatus having an optical system and a film guide for a plural row film, and wherein is a feed device for advancing the film, with connections to give the device a four-motion movement, comprising a shank carrying the feed device, a sliding mounting and a swinging mounting for the shank, one of said mountings being free and the other stiffly resistant, and a reciprocating member acting on the shank at an offset point of application to effect cooperative sliding and tilting movements and thereby such four-motion movement with means to reverse the offset point of application after one film row is exposed, thereby to reverse the direction of feed for exposing another film row.

7. Motion picture apparatus having an optical system and a film guide, and wherein is a feed device for advancing the film, with mechanism to give the device a four-motion feed movement, in a plane substantially parallel to the optical axis and to the direction of film travel and at right angles to the plane of the film, a rotary shutter in front of the film, and a connection between the device and shutter for translating such four-motion feed movement of said device to rotary movement of said shutter.

8. Motion picture apparatus having film supply and receiving reels, a film feed drive mechanism, a shutter, a lens shiftable transversely to expose one or another zone of the film, a follower constantly engaging directly the film convolutions on both of said reels, and means operated by the movement of said follower relative to said reels, to cause transverse shift of said lens and to reverse said drive mechanism, said means comprising a quick reversing device connected to be placed under increasing stress by the movement of the follower until at the reversing point the device yields abruptly to its reversed position.

ROGER L. NOWLAND.